(12) United States Patent
Simpson

(10) Patent No.: US 6,196,939 B1
(45) Date of Patent: Mar. 6, 2001

(54) HYDRAULIC TENSIONER WITH A HYDRAULICALLY CONTROLLED RACK

(75) Inventor: Roger T. Simpson, Ithaca, NY (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/322,694

(22) Filed: May 28, 1999

Related U.S. Application Data

(60) Provisional application No. 60/101,261, filed on Sep. 21, 1998.

(51) Int. Cl.$^7$ ............................... F16H 7/22; F16H 7/08; F16H 7/12
(52) U.S. Cl. ........................ 474/110; 474/109; 474/101; 474/138
(58) Field of Search ..................... 474/101, 109, 474/110, 111, 112, 117, 135, 136, 138, 91, 107

(56) References Cited

U.S. PATENT DOCUMENTS

| | | | |
|---|---|---|---|
| 3,802,286 | 4/1974 | Winklhofer et al. | 74/242.11 |
| 3,812,733 | 5/1974 | Yoshida | 74/242.11 |
| 4,504,251 | * 3/1985 | Mittermeier | 474/110 |
| 4,713,043 | 12/1987 | Biedermann | 474/111 |
| 4,792,322 | 12/1988 | Goppelt et al. | 474/136 |
| 4,822,320 | 4/1989 | Suzuki | 474/111 |
| 4,874,352 | 10/1989 | Suzuki | 474/110 |
| 5,004,448 | 4/1991 | Ojima | 474/111 |
| 5,006,095 | 4/1991 | Suzuki | 474/111 |
| 5,073,150 | 12/1991 | Shimaya | 474/110 |
| 5,259,820 | 11/1993 | Mott | 474/110 |
| 5,304,099 | 4/1994 | Deppe et al. | 474/110 |
| 5,346,436 | * 9/1994 | Hunter et al. | 474/110 |
| 5,577,970 | 11/1996 | Smith et al. . | |
| 5,643,117 | * 7/1997 | Dembosky | 474/110 |
| 5,653,653 | 8/1997 | Ledvina | 474/110 |
| 5,700,214 | 12/1997 | Kuznets et al. | 474/110 |
| 5,860,881 | 1/1999 | Tada | 474/110 |

FOREIGN PATENT DOCUMENTS 2 122 685   1/1984   (GB) .............................. F15B/15/20

OTHER PUBLICATIONS

European Search Report for Application No. EP 99307318.8 dated Feb. 10, 2000.

* cited by examiner

*Primary Examiner*—David A. Bucci
*Assistant Examiner*—Marcus Charles
(74) *Attorney, Agent, or Firm*—Sidley & Austin; Greg Dziegielewski

(57) ABSTRACT

A hydraulic tensioner having a hydraulically actuated rack member. A pair of check valves permit fluid to flow from an external source of pressurized fluid into a fluid chamber. The two check valves form a substantially fluid tight chamber in order to provide sufficient pressure to prevent the piston from retracting upon deenergization of the source of pressurized fluid.

8 Claims, 2 Drawing Sheets

FIG.1
PRIOR ART
FIG.2
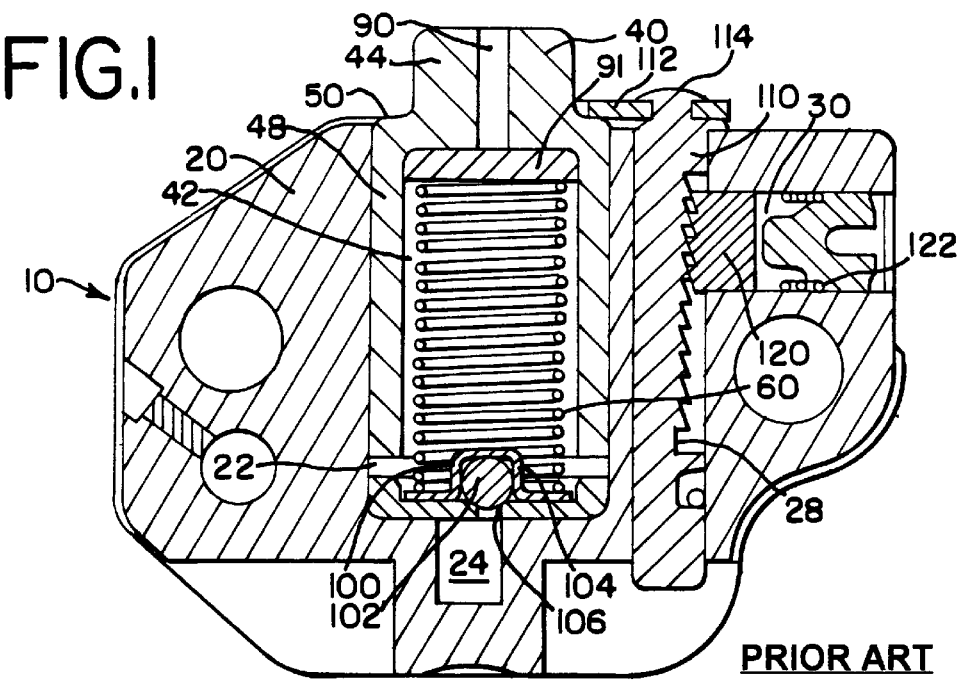
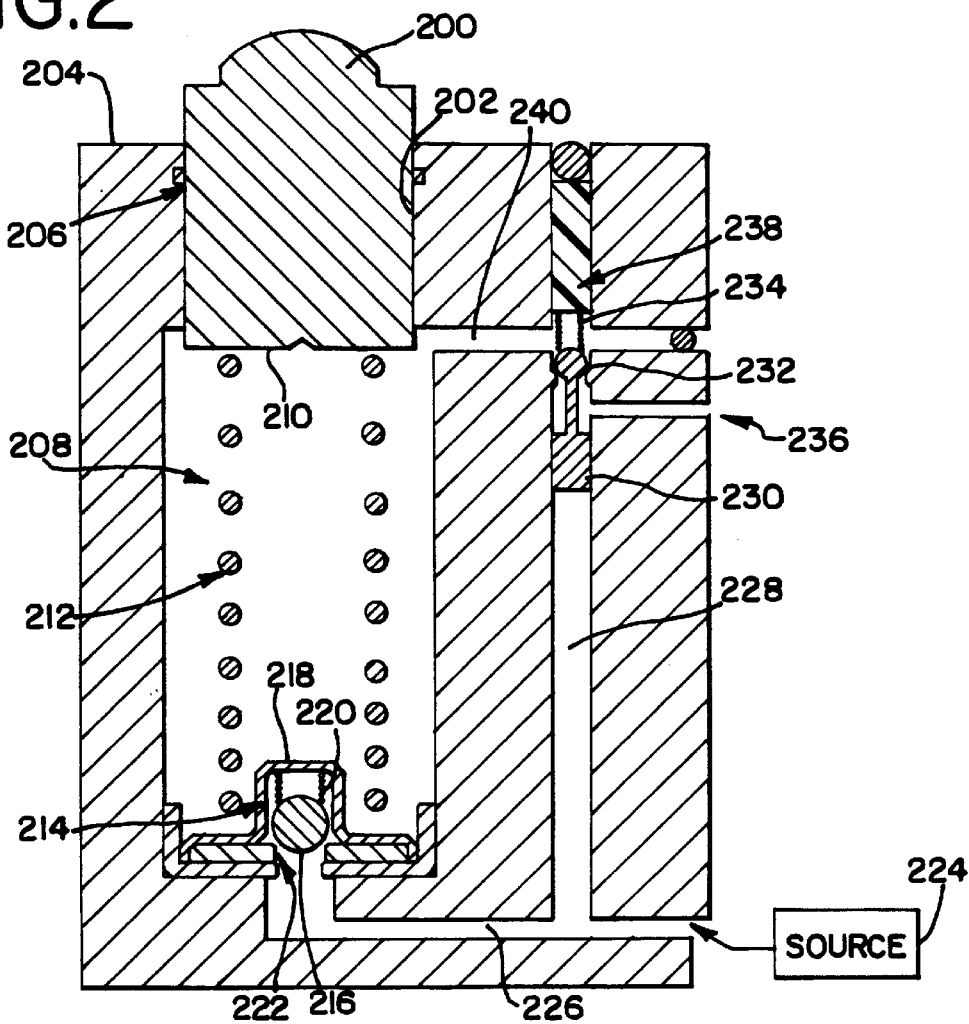

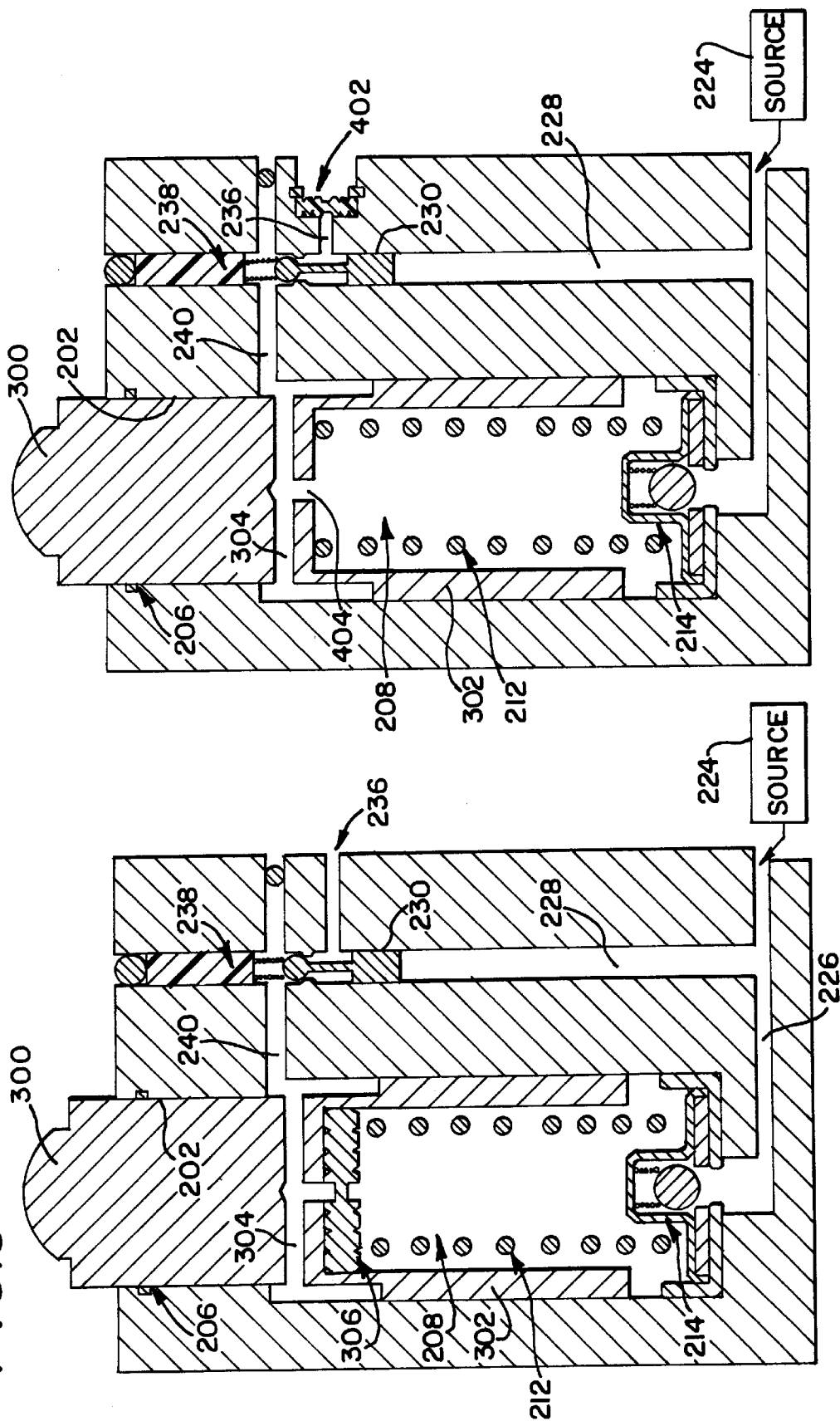

HYDRAULIC TENSIONER WITH A HYDRAULICALLY CONTROLLED RACK

This application claims benefit of provisional application U.S. Ser. No. 60/101,261, filed Sep. 21, 1998. Reference is made to co-pending U.S. application Ser. No. 09/232,388, filed Jan. 15, 1999 now issued as U.S. Pat. No. 5,989,139, entitled "Hydraulic Tensioner With External Rack" the subject matter of which relates to the present invention and is incorporated herein by reference.

BACKGROUND OF THE INVENTION

The present invention relates to a hydraulic chain tensioner having an external rack or similar component to provide a no-return function in the tensioner. More particularly, the hydraulic tensioner of the present invention has a hydraulically controlled rack that limits or restricts backlash to provide a no-return function for the piston.

Hydraulic tensioners are typically used as a control device for a chain drive in an automobile engine timing system. The tension in the chain can vary greatly due to the wide variation in the temperature and the linear expansion among the various parts of the engine. Moreover, wear to the chain components during prolonged use can produce a decrease in the tension of the chain. A hydraulic tensioner is used to take up the slack in the chain or belt that connects the camshafts to the crankshaft of the engine timing system. The tensioner piston must be able to extend outward as the chain stretches from higher engine speed and withdraw back inward when the chain loads have decreased with lower engine speeds. The piston travel from idle to maximum engine speed for most overhead cam engines ranges from 1 to 4 mm.

A typical hydraulic tensioner is comprised of a housing having a bore, a piston biased in a protruding direction from the bore by a spring, and a fluid chamber defined by the hollow piston and bore. A check valve is also included in the hydraulic tensioner to permit fluid flow from a source of pressurized fluid into a reservoir or oil supply passage into the fluid chamber, while preventing back flow in the reverse direction. The force of the chain against the piston in an inward direction is balanced by the resistance force of the fluid and the force of the spring in an outward direction.

A typical hydraulic tensioner usually has a no-return function, where the piston moves easily in one direction, but with more difficultly in the reverse direction. When the engine is started, the oil supply pressure to the tensioner is delayed by several seconds. During this time, the tensioner may not have enough oil to fill the fluid chamber. As a result, the piston could be pushed to the bottom of the tensioner bore from the chain motion. A proper load would not be maintained on the chain and noise could be generated. In addition, the lower piston position might even allow the chain to jump a tooth on either the crank or cam sprockets.

One example of a tensioner having a no-return function is shown in Winklhofer et al., U.S. Pat. No. 3,802,286. The piston of the Winklhofer et al. tensioner has a spiral rack on the inside wall of the bore to limit back travel and prevent the piston from retracting. Another example of a tensioner having a no-return function, Yoshida, U.S. Pat. No. 3,812,733, has a ratchet system with grooves on the outside of a piston and a detent with a spring to prevent the piston from advancing and retracting. Similarly, in U.S. Pat. No. 4,713,043, Biedermann includes grooves on the outside of the piston with a spring-loaded catch.

The rack or no-return system must also permit some backlash or limited backward piston movement. In U.S. Pat. No. 4,792,322, Goppelt addresses the problem of insufficient backlash by including an internal ring and groove system. An additional ring and groove are also used to hold the piston in place during shipping. This system is expensive because the grooves must be on the inside of the tensioner bore as well as on the outside of the piston.

Suzuki, U.S. Pat. No. 4,822,320 also provides an anti-backlash rack with grooves broached into the outside of the piston. A ratchet is pivotally connected to a housing to allow positive backlash. Suzuki also provides this ratchet system in U.S. Pat. No. 4,874,352, where the ratchet is supported by a spring, and in U.S. Pat. No. 5,006,095, where the number of teeth on the ratchet is n times that of the teeth on the rack. In addition, Shimaya, U.S. Pat. No. 5,073,150, incorporates the ratchet mechanism of Suzuki with a different tensioner.

Another example of a ratchet mechanism is disclosed in Deppe et al., U.S. Pat. No. 5,304,099. The ratchet mechanism of Deppe et al. includes grooves on the outside of a piston and a ratchet plunger biased by a spring. The ratchet is disengaged during normal operations and engaged during shut down to maintain the tensioner in an operative position.

An example of a mechanism that limits the travel of a shaft device is disclosed in Ojima, U.S. Pat. No. 5,004,448. A coil portion contacts a tension rod. The coil acts as a friction brake by causing an enlargement to prevent advancement of the rod or a shrinkage of the diameter of the coil portion to release the rod from the tensioner.

Mott, U.S. Pat. No. 5,259,820, provides an internal ratchet system positioned within the mounting cavity and constructed from a cylinder having two helical openings. The piston engages with the helical openings when the piston experiences sufficient force to be pushed inward. As a result, this tensioner provides tension to the chain when the fluid pressure to the tensioner is low.

Similarly, in the present invention, a hydraulically actuated rack is provided to provide tension during low pressure conditions. The anti-backlash feature or no-return feature prevents the piston from retracting when the oil pressure in the tensioner decreases.

SUMMARY OF THE INVENTION

The present invention is directed to a hydraulic chain tensioner having a hydraulically actuated rack. The tensioner includes a housing with a central bore. A hollow piston is slidably received within the bore and creates a fluid chamber with the bore. The hollow piston, or plunger, is biased in a protruding direction from the housing by a spring.

A passage is provided in the housing to connect the fluid chamber with a source of pressurized fluid. A check valve is provided between the chamber and the source of pressurized fluid to permit fluid flow into the chamber, while blocking flow in the reverse direction. The check valve may be a ball and spring check valve, a spring valve, or a variable orifice check valve, as presently known in the tensioner art.

The tensioner also includes an external rack with an anti-backlash or backlash limitation feature. When oil is supplied to the tensioner through the main check valve, a vent check valve also opens. When the main check valve closes, the vent check valve also closes, which provide an oil-tight system that includes the high pressure chamber and the vent passage. The hydraulic pressure is maintained in the oil-tight system and retraction of the piston is prevented.

When oil is again supplied to the piston, the vent check valve opens and the oil that was trapped in the chamber is allowed to escape or vent to atmosphere. A tortuous path vent may also be included in the vent opening.

BRIEF DESCRIPTION OF THE DRAWINGS

FIG. 1 is a sectional view of a conventional hydraulic tensioner of the prior art with an external rack and ratchet system.

FIG. 2 is a sectional view of the tensioner of present invention illustrating the hydraulic circuit to maintain oil pressure in the chamber.

FIG. 3 is a sectional view of another embodiment of the tensioner of present invention with a tortuous path vent in the high pressure chamber.

FIG. 4 is a sectional view of another embodiment of the tensioner of present invention with a tortuous path vent in the vent path opening.

DETAILED DESCRIPTION OF THE PREFERRED EMBODIMENTS

FIG. 1 illustrates a hydraulic tensioner 10 of the prior art. The tensioner includes a housing 20 having a fluid chamber 22 filled with fluid through a passageway 24 from a source of pressurized fluid (not shown). The fluid source may be an oil pump or a reservoir. The chamber, which is typically cylindrical, receives a hollow piston 40, also typically cylindrical, having an interior space 42 and an upper end 44 with an aperture 90. The upper end 44 contacts a lever or arm (not shown) to provide tension along a chain strand. A spring 60 contacts the inside 48 of the upper end of the piston to bias the piston in a protruding or outward direction from the bore or housing.

During start-up, fluid enters through passageway 24 and fills the chamber 22 while pushing air to t he upper end of the chamber, pas t the vent disc 91. As the chamber fills with fluid, the piston moves outward from the chamber due to the force of the spring and the pressure of the fluid from the external source.

A check valve 100 is provided between the chamber 22 and the passageway 24 to permit fluid flow into the chamber but to block fluid flow in the reverse direction. The check valve includes a ball 102, and a spring biasing the ball toward the seat 106.

The tensioner includes a conventional rack and ratchet assembly to provide a mechanical no-return function. The piston is provided with an external rack 28 that is secured to the piston at the upper end 110 of the rack. As the piston moves outward, the rack also moves outward. The rack is provided with a flange 112 at its upper end that contacts a shoulder 50 on the upper end of the piston. The housing also includes a lateral cavity 30 in which a ratchet 120 and spring 122 are received. The spring 122 biases the ratchet into meshing arrangement to provide the mechanical no-return function.

During start-up of the hydraulic chain tensioner, after the tensioner has been installed, the piston is pushed outward by the force of the piston spring on the piston. As a result of the pressure differential formed across the check valve 100, fluid enters through passageway 24 and flows through the check valve and into the chamber 22 while pushing air to the upper end of the chamber 22. The chamber 22 continues to fill with fluid until the force inward on the piston 40 by the chain (not shown) is balanced by the force of the spring 60 and the resistance force of the fluid in the chamber 22.

The tensioner of the present invention, in one embodiment, is illustrated in FIG. 2. The piston 200 is received in a bore 202 in the housing 204, which is sealed by piston seal 206. A high pressure fluid chamber 208 is formed between the base of the piston 210 and the hollow space inside of the housing. As previously described, the tensioner includes a piston spring 212 and main check valve 214, which includes a ball 216, housing 218, and spring 220 to bias the ball away from the housing 218 and against a seat 222.

Oil supply pressure from source 224 flows through passageway 226 to the main check valve 214 and also through a rack or secondary passageway 228. The fluid in second passageway 228, acts on normally closed vent check valve 230, which includes a ball 232 and spring 234 to bias the ball in the closed position. The vent includes an opening 236 to permit venting of air to atmosphere. The ball 232 and spring 234 are biased against a spacer 238 located in the housing.

During operation, upon the creation of a pressure differential across the main check valve 214, the check valve opens and permits fluid to flow into the chamber 208. The secondary or vent check valve 230 also opens and permits fluid to flow from the chamber via the third passageway 240 between the chamber 208 and the check valve 230.

When the oil pressure drops, such as upon shut-down of the engine, the main check valve 214 and the vent check valve 230 remain closed and keep the fluid within the chamber in an substantially oil-tight system. In this manner, the oil pressure remains sufficiently high in the chamber so that the piston does not retract into the bore, and the tensioner achieves a no-return function. Upon start-up of the engine, before oil pressure reaches normal operating pressure, the tensioner piston is hydraulically maintained in a no-return state and provides proper load to the chain.

A preferred embodiment is shown in FIG. 3, which includes many of the same components of the tensioner of FIG. 2. The similar components have been given the same numerical indications in FIG. 3 as in FIG. 2. In this embodiment, however, the piston 300 includes a base portion 302. The base portion 302 provides a series of passageways 304 between the base portion and the third passageway 240. A vent disc 306 is provided in the upper end of the chamber 208 against the base portion of the piston.

In this embodiment, the vent disc 306 acts to prevent the escape of oil from the chamber 208 into passageway 304.

Another embodiment of the tensioner of the present invention is shown in FIG. 4, which includes many of the components of the embodiment of FIG. 3. In this embodiment, no vent disc 306 is used in the chamber. Instead, a vent disc 402 is included in the vent opening 236. This embodiment operates in the same manner as the embodiment of FIG. 3. However, a passage 404 permits fluid to leave the chamber 208 and enter the fourth passageway 304, which assists in the pressure balance to maintain the piston in an extended position.

In operation of all three of the described embodiments, backlash or backdrive of the piston is limited or prevented by the maintenance of pressure in the chamber.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:
    a housing having a bore;
    a piston slidably received within the bore, said piston forming a fluid chamber with said bore;
    a piston spring biasing said piston in an outward direction from said bore;
    a main check valve provided between the fluid chamber and a source of pressurized fluid to permit fluid flow from a first passageway past said main check valve and into the fluid chamber upon energization of said source of pressurized fluid while blocking flow in the reverse direction;
    a vent check valve provided in a second passageway between said fluid chamber and said source of pressurized fluid, said vent check valve permitting fluid to flow past said vent check valve from said source of pressurized fluid upon energization of said source of pressurized fluid while blocking flow in the reverse direction;
    a third passageway having a portion located between said vent check valve and said fluid chamber, said third passageway permitting fluid to collect between said fluid chamber and said vent check valve, said fluid in said third passageway causing a said vent check valve to close upon deenergization of said source of pressurized fluid;
    said main check valve and said vent check valve providing a substantially fluid tight outlet from said chamber to prevent fluid from exiting said fluid chamber after being permitted to enter said chamber, said substantially fluid tight outlet providing sufficient fluid pressure in said chamber to prevent retraction of said piston into said chamber upon deenergization of said source of pressurized fluid.

2. The hydraulic tensioner of claim 1 wherein said third passageway extends into the bore of said piston.

3. The hydraulic tensioner of claim 1 wherein a vent disc is positioned between said piston spring and said piston.

4. The hydraulic tensioner of claim 1 wherein said third passageway forms a part of said fluid chamber.

5. The hydraulic tensioner of claim 1 wherein said second passageway includes a vent opening to the atmosphere.

6. The hydraulic tensioner of claim 3 wherein said piston includes a hollow interior, said fluid chamber being located within the interior of said piston.

7. The hydraulic tensioner of claim 3 wherein said vent disc is positioned between said third passageway and said fluid chamber.

8. The hydraulic tensioner of claim 5 wherein said vent opening includes a vent disc.

* * * * *